June 19, 1962 W. HOUSER ET AL 3,039,124
LAWN SWEEPER
Filed Oct. 5, 1959 5 Sheets-Sheet 1

INVENTORS
THEOPHILUS P.R. STOUT
WARNER HOUSER
BY Schmieding & Fultz
ATTORNEY

June 19, 1962 W. HOUSER ET AL 3,039,124
LAWN SWEEPER
Filed Oct. 5, 1959 5 Sheets-Sheet 2
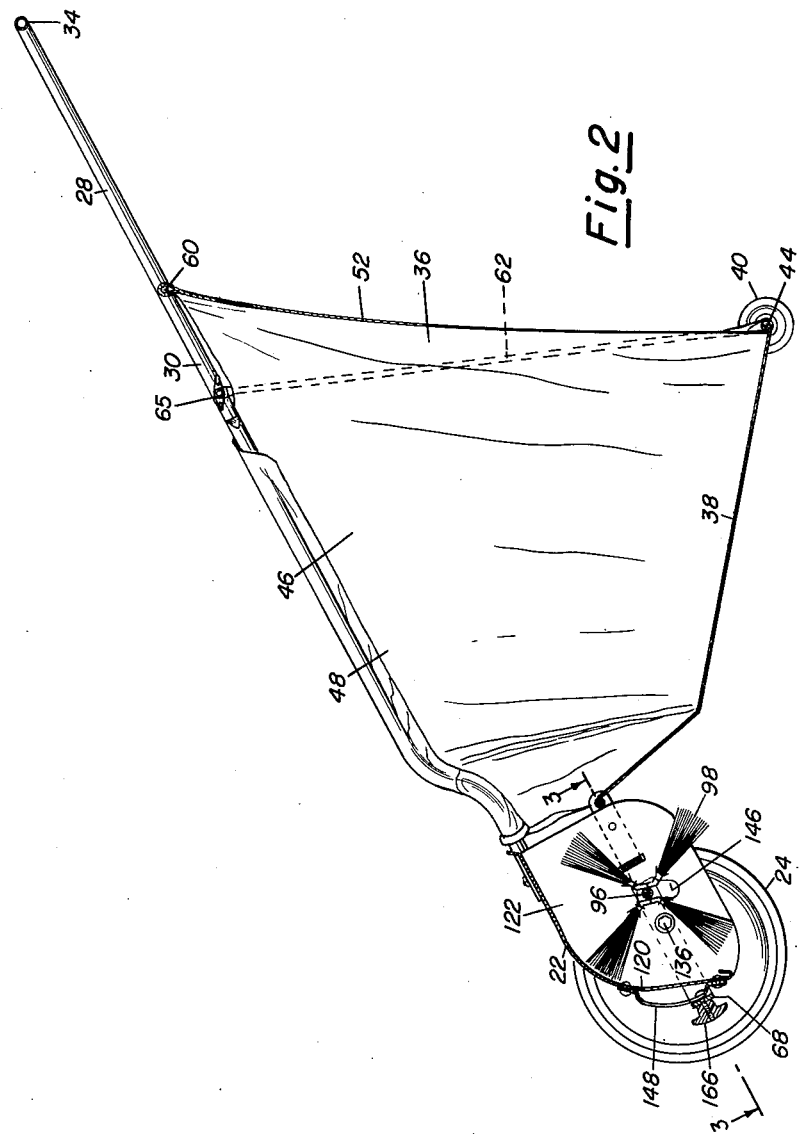
INVENTORS
THEOPHILUS P. R. STOUT
WARNER HOUSER
BY
Schmieding & Fultz
ATTORNEY

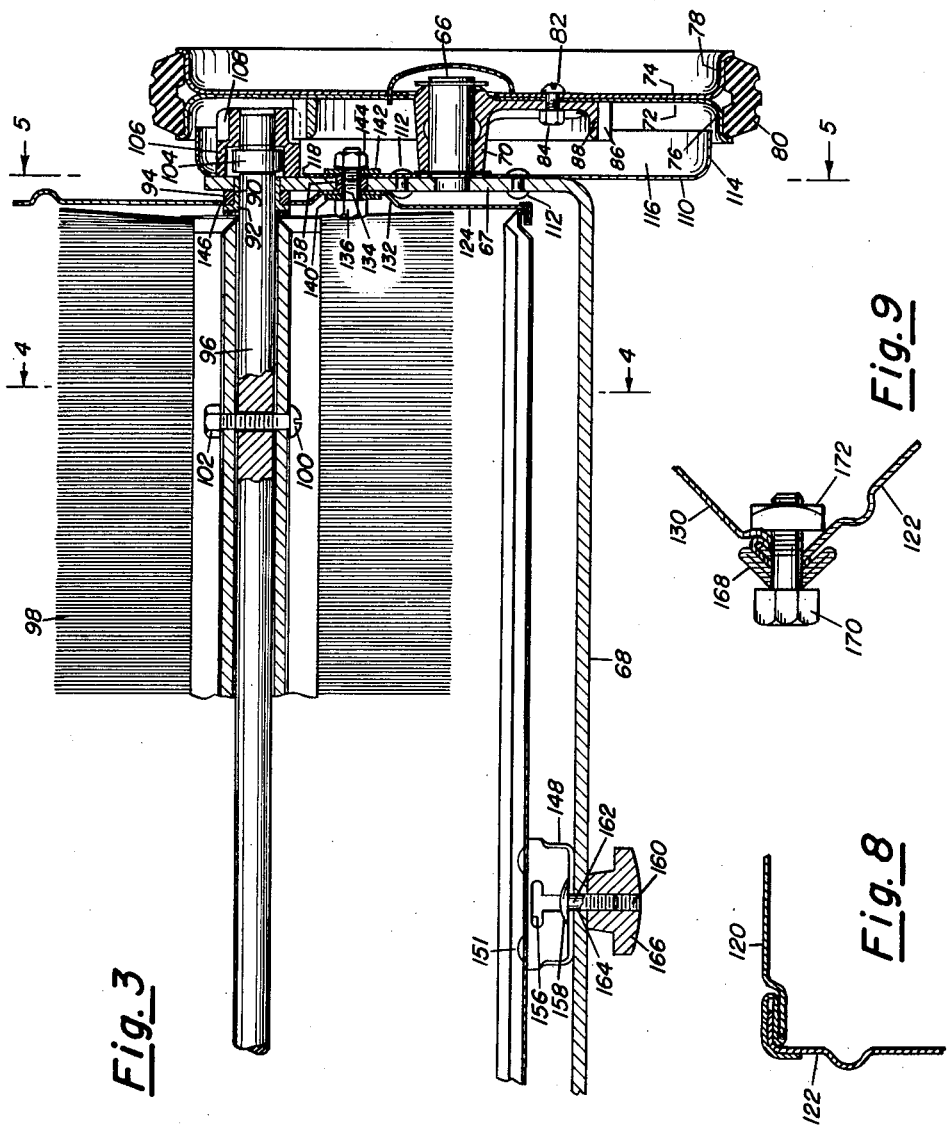

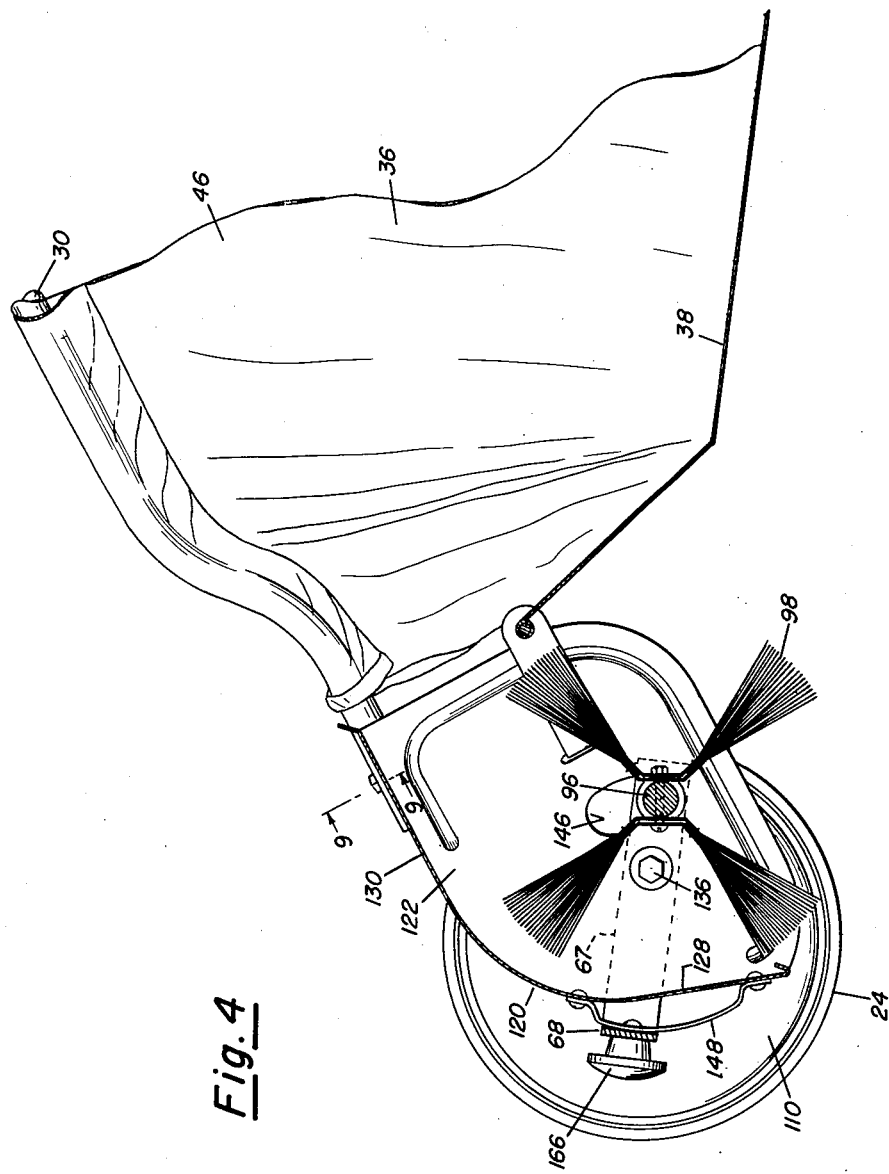

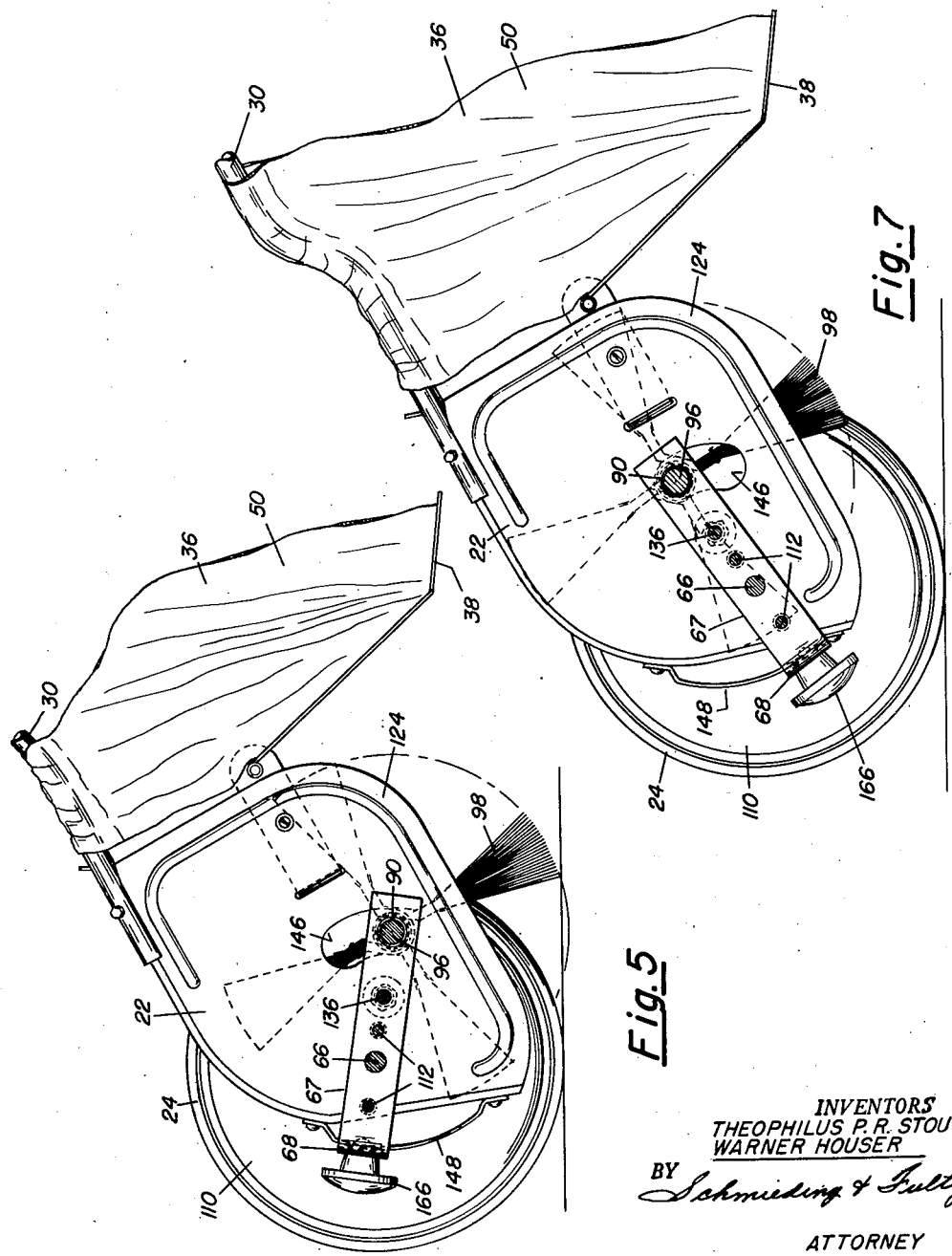

3,039,124
LAWN SWEEPER
Warner Houser, Springfield, and Theophilus P. R. Stout, North Hampton, Ohio, assignors to Parker Sweeper Company, Springfield, Ohio, a corporation of Ohio
Filed Oct. 5, 1959, Ser. No. 844,579
9 Claims. (Cl. 15—79)

The present invention relates to a sweeper of the type used primarily on lawns, driveways and sidewalks, and employs a rotating brush.

When such sweeper is utilized for collecting leaves, twigs, grass clippings or other debris usually found on lawns and if the standing grass is relatively long, the brush should be at its highest position. When the sweeper is used for sweeping driveways or sidewalks, the brush should be at its lowest position. And, the brush should be capable of being positioned and held in any of the other intermediate positions, depending, principally, on the length of the standing grass.

The front end of the hood should be lowered when the brush is lowered and should be raised when the brush is raised.

In this type of sweeper, the rotating brush, in combination with the hood, causes the debris to be lifted from the surface being swept and causes the debris to be flung into a debris receptacle.

In practicing the present invention, the sweeper is so constructed that the front end of the hood is raised or lowered when the brush is raised or lowered, respectively. Also the construction of the sweeper is such that trajectory of the debris from the hood to the debris receptacle is maintained substantially constant, regardless of the height of the brush.

Further objects and advantages will be apparent from the following description, reference being had to the accompanying drawings wherein a preferred embodiment of the invention is illustrated.

In the drawings:

FIG. 2 is a sectional view taken along line 2—2 of FIG. 1, the approximate scale of which is 6 to 1;

FIG. 3 is a sectional view taken along line 3—3 of FIG. 2 but on a scale of approximately 3 to 1;

FIG. 4 is a sectional view taken along line 4—4 of FIG. 3, showing the brush in its lowermost position;

FIG. 5 is a sectional view taken along line 5—5 of FIG. 3, showing the brush in its lowermost position;

FIG. 7 is a view similar to FIG. 5 but showing the brush in its highest position.

FIG. 8 shows the Pittsburgh lock joint employed in the construction of the hood for the machine; and FIG. 9 shows one of the joints between the handle bar and the hood, the joint being shown in section, the section being taken along line 9—9 of FIG. 4.

Figure 1:
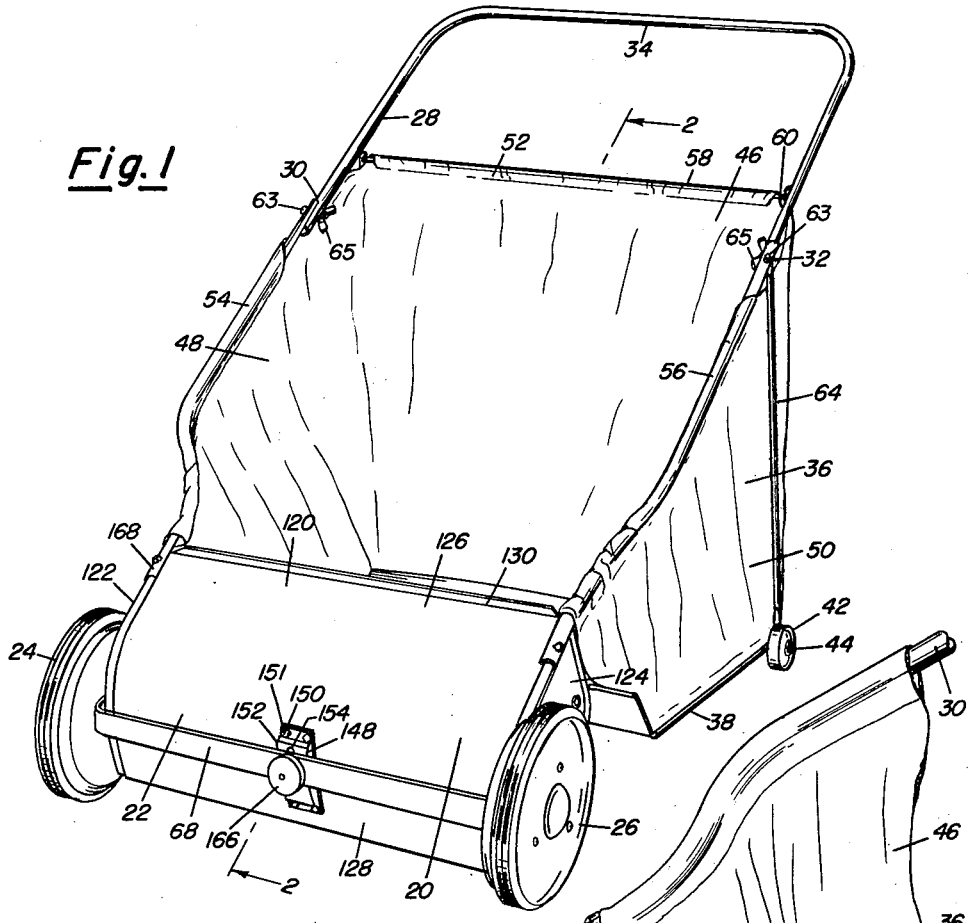
FIG. 1 is a perspective view of the improved sweeper.

Referring generally to the drawings, the sweeper 20 includes a sweeper head 22 which is supported by wheels 24 and 26 and is manipulated by a handle 28. This handle 28 includes handle bars 30 and 32 having their lower ends connected to the top of the sweeper head 22, and the connecting yoke 34 thereof connects the handle bars 30 and 32 and is disposed at the extreme rear end of the handle. A debris receptacle 36 includes a bottom 38 and is carried by wheels 40 and 42. These wheels are carrier by an axle 44. The debris receptacle 36 also includes a flexible bag 46. The side walls 48 and 50 and the rear wall 52 are suitably atatched to the bottom 38; the top of the side walls 48 and 50 are provided with hems 54 and 56 which receive the handle bars 30 and 32.

The top of the back 52 is provided with a hem 58 which receives a rod 60 and this rod is suitably fastened to the handle bars 30 and 32. Rods 62 and 64 have their lower ends connected to the axle 44 and their upper ends to bolts 63. These bolts are used for connecting the upper section of the handle bars to the lower section. The rods 62 and 64 and handle bar section are held onto bolt 63 by wing nuts 65. These rods 62 and 64 hold the handle 28 in its uppermost position.

Referring more in detail to the sweeper head 22, it will be seen that the wheels 24 and 26 support aligned axles, one of which is shown at 66. These axles are suitably attached to legs of the U-shaped frame 68 as by welding or swedging. One of these legs is shown at 67; the other leg (not shown) is disposed at the opposite side of the sweeper head and also carries an axle 66. Each of the wheels is provided with a hub 70 which is journalled on a shaft 66. Each wheel includes two plates 72 and 74 having their bottoms confronting one another and suitably welded and/or bolted to one another. These plates are provided with peripheral rims 76 and 78, respectively, and these rims in turn carry a rubber tire 80. The plates 72 and 74 are attached to the hub 70 by screws 82 and nuts 84.

The periphery of the hub 70 is provided with gear teeth 86 and thus forms a ring gear 88 with radially extending teeth.

Figure 6:
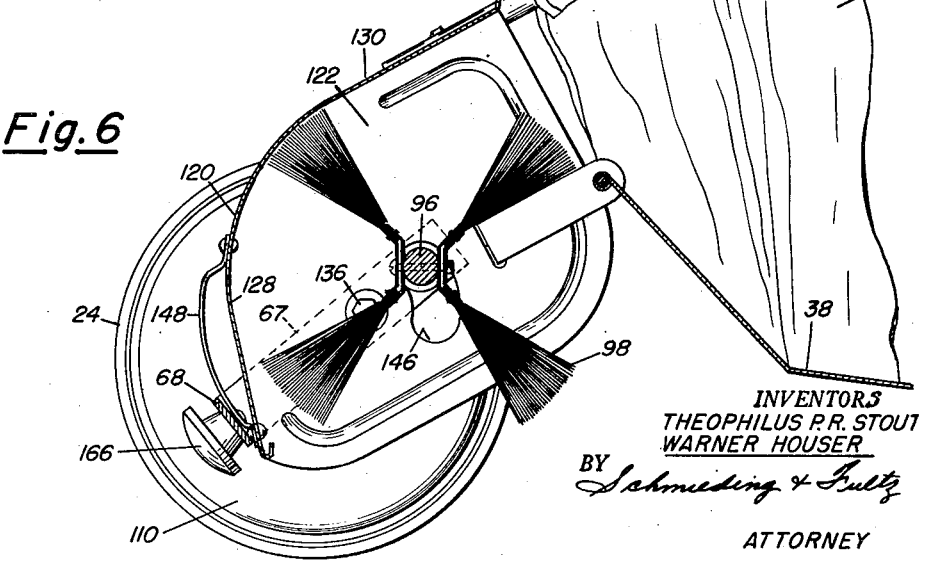
FIG. 6 is a view similar to FIG. 4 but showing the brush in its uppermost position.

Each of the legs 67 of the frame 68 carries a bearing 90, preferably of the nylon type, the inner end of which is provided with a flange 92 which is spaced inwardly from the inner side of the leg 67 by a spacer 94. A shaft 96 is suitably journalled in the aligned bearings 90 and carries a brush 98. This brush may be attached to the shaft 96 in any suitable manner, and is herein shown as attached by screws 100 and nuts 102. The shaft 96 has its ends extending outwardly of the leg 67 and this outer end carries a pall 104. Pinions 106 are journalled in the ends of the shaft 96 having teeth 108 which mesh with the teeth 86 of the ring gear 88. The pall 104 is provided with a suitable dog which is adapted to engage with internal teeth in the pinion. Such pall and teeth are not shown in detail, since they are the type usually employed in lawn mowers and sweepers, and so arranged so as to drive the brush 98 in a clockwise manner as viewed in FIGS. 4 and 6 when the sweeper is being moved to the left, the dog being disengaged from the internal teeth of the pinion when the sweeper is moved rearwardly, that is, to the right as viewed in FIGS. 4 and 6 whereby movement is not imparted to the brush 98 upon rearward movement of the sweeper.

Cup shaped covers 110 are attached to the leg 67 of the frame 68 as by rivets 112. These covers are interposed between the outer side of the leg 67 and the wheel, and have peripheral rims 114 extending outwardly beyond the inner edges of the rims 76 of plate 72. The rims 114 extend to substantially adjacent the rims 76 so as to prevent debris from entering into the housings 116 formed by the plate 72 and the cover 110. These covers 110 are provided with openings 118 for receiving the pinion 106.

The sweeper head 22 also includes a hood 120; this hood includes allochirally shaped side plates 122 and 124, preferably formed of sheet metal. The hood also includes a sheet of metal 126 which is bent to provide the front 128 and the top 130 of the hood. The sheet 126 is joined with the side plates 122 and 124 preferably by a Pittsburgh lock joint which is more clearly shown in FIG. 8.

Referring specifically to FIG. 3 it will be seen that the side plate 124 is provided with an outwardly pressed circular portion which is axially drilled as at 134 for receiving a bolt 136. This bolt 136 extends through a spacer 138 which is carried by the leg 67 of the frame 68. This spacer 138 is slightly longer than the combined width of the leg 67 and the metal of the cover 110. The spacer is held in position by washers 142 and by nut 144. Thus the legs 67 are free to rotate on the bolts 136.

The side plates are also provided with arcuately shaped slots 146 having a width slightly larger than the width of the spacer 94 at the bearing 92 whereby, when there is a pivotal movement of the frame 68 with respect to the hood, there can be relative movement between the brush mechanism and the hood.

It will thus be seen that if, for example, the front of frame 68 is moved downwardly, it will pivot about the spacer 138 and the rear parts of the legs 67 will be raised. Inasmuch as the rear part of the hood is held relatively stationary by the handle 28 and inasmuch as the elongated arcuately shaped slot 146 permits relative movement between the hood and the brush, and inasmuch as the hood and frame legs 67 are pivotally connected with one another, the rear end of the legs 67 can be raised relative to the side wall 124. The reverse occurs when the front of frame 68 is moved upwardly in a clockwise direction, as viewed in FIGS. 4 and 5.

Thus it will be seen that when the brush is raised, the front end of the hood is also raised, or when the brush is lowered, the front end of the hood is also lowered. The lever arm between the axis of the axles 66 and the axis of the spacer 138 is of such length to provide the desired ratio of relative upward and downward movement of the brush and the lower end of the front of the hood.

Inasmuch as the hood is not rotated to any material degree, its angular relationship of the top 126 with respect to the debris receptacle 36 is maintained substantially constant whereby the trajectory from the hood to the debris receptacle is maintained substantially constant, regardless of the height of the brush.

The relative position of the frame 68 with respect to the hood can be maintained at that desired and for this purpose there is provided a bracket 148 having its upper and lower ends riveted as at 150 to the hood front as by rivets 151. The intermediate portion 152 of this bracket is spaced forwardly of the hood front 128 and has its axis coinciding with the axis for spacer 138; it is provided with a vertically extending slot 154 which merges into a horizontally extending slot 156 for receiving the head 158 of a bolt 160. This bolt is provided with a square shank 162 adjacent the head and fits within a square shaped hole 164 in the frame 68 and is thereby prevented from turning. An internally threaded knob 166 is threaded on the outwardly extending end of the bolt 160. This knob when loose upon the bolt 160 permits relative movement between the frame 68 and the hood 120, but when tightened, locks the frame 68 with the hood.

In this manner, by merely shifting the frame 68 downwardly or upwardly at the front, the brush can be raised or lowered as desired and then held in adjusted position by the bolt 160 and knob 166.

The ends of the brush should be brought close to the inner side of the lower front of the hood to provide for the most efficient operation of the lawn sweeper. If not, the debris, leaves or grass is not swept into the hood properly, nor are such matters flung rearwardly properly from the hood to the debris receptacle. As will be seen from the drawings, that due to the fact that the axes of brush shaft 96, the bearing therefor, and the bolt 136, and the axles 66, lie in the same plane, a substantially constant distance is maintained between the axis of the brush and the inner side of the lower front of the hood, whereby efficient lifting of the debris, leaves and grass and efficient rearward flinging movement of such matters is maintained, whether the brush is adjusted to its lowermost position or highermost position, or any intermediate position.

From the foregoing it will be seen that the proper adjustment of the height of the brush can be readily attained with the desired relative up and down movement at the lower front of the hood, and these adjustments can be attained without disturbing the trajectory of the debris as it passes from the hood to the debris receptacle.

Since the lower ends of the handle bars are attached to the upper rear end of the hood 120, the lower ends of the sides 48 and 50 of the debris receptacle 36 extend as high as the rear end of the hood and then increase in height and width rearwardly. Due to this height of the sides of the debris receptacle, cross winds have very little or no effect upon diverting the debris as it is thrown rearwardly by the brush from the rear of the hood into the debris receptacle.

Referring more in detail to FIG. 9, it will be seen that the lower ends 168 of the handle bars 30 and 32 are flattened and are bent to a substantial V in cross-section. The upper part of the V overlies the upper parts of the side plates 122 and hood 130 and the side parts of the V overlie the outer sides of the side plates 122 and hood 130, and these ends 168 are secured by fixing the same to the hood 120 by bolts 170 and nuts 172.

While the form of embodiment herein shown and described constitutes a preferred form, it is to be understood that other forms may be adopted falling within the scope of the claims that follow.

What is claimed is:

1. A lawn sweeper, comprising in combination, a frame; a pair of spaced wheels; horizontally disposed and axially aligned axle means on the frame, said wheels being journaled on the axle means, said frame being rotatable about the aligned axle means; aligned bearings carried by the frame, said bearings being arranged parallelly of the aligned axle means; a rotatable brush carried by the bearings; a hood open at the rear and bottom and having portions enclosing substantially the entire front, top and sides of said brush, said brush extending to adjacent the rear of the front portion of the hood; and pivotal means on the frame intermediate the aligned axle means and bearings for pivotal attachment between the frame and hood, the axes of said axle means and of said aligned bearing and of said pivotal means lying in substantially the same plane.

2. A lawn sweeper as defined in claim 1, in which the bearings are disposed rearwardly of the aligned axle means for the wheels.

3. A lawn sweeper as defined in claim 1, in which there is included means for preventing relative movement between the frame and hood.

4. A lawn sweeper as defined in claim 1, in which there is included means for adjusting the relative position of the hood with respect to the frame.

5. A lawn sweeper, comprising in combination, a frame; a pair of spaced wheels; horizontally disposed and axially aligned axle means on the frame, said wheels being journaled on the axle means, said frame being rotatable about the aligned axle means; aligned bearings carried by the frame, said bearings being arranged parallelly of the aligned axle means; a rotatable brush carried by the bearings; a hood open at the rear and bottom and having portions enclosing substantially the entire front, top and sides of said brush, said brush extending to adjacent the rear of the front portion of the hood; pivotal means on the frame intermediate the aligned axle means and bearings for pivotal attachment between the frame and hood, the axes of said axle means and of said aligned bearing and of said pivotal means lying in substantially the same plane; a gear carried by one of the wheels; a pinion meshing with the gear and connected with the brush, said gear and pinion being disposed between the wheel and the frame; and a cover for the gear and pinion attached to the frame.

6. A lawn sweeper as defined in claim 5, in which the bearings are disposed rearwardly of the aligned axle means for the wheels.

7. A lawn sweeper as defined in claim 5, in which there is included means for preventing relative movement between the frame and hood.

8. A lawn sweeper as defined in claim 5, in which there is included means for adjusting the relative position of the hood with respect to the frame and for retaining the frame and hood in the adjusted position.

9. A lawn sweeper comprising a head including a frame, a hood, means for pivotally mounting the frame on the hood, aligned axle means extending from opposite sides of the frame, wheels journalled on the aligned axle means on opposite sides of the hood, said hood extending upwardly and rearwardly, a rotatable shaft carried by the frame spaced from said pivot means, the axes of said shaft, said pivot means and axle means being arranged parallelly, a rotatable brush within the hood carried by the shaft; a debris receptacle disposed rearwardly of the hood, said debris receptacle including a flexible bag; handle means for manipulating the sweeper comprising spaced bars fixed to the hood at the extreme top rear end of the hood, the upper part of said bag being carried by the handle bars and extending forwardly substantially to the hood, said frame being rotatable about said pivot means for adjusting the height of said shaft; and means on said hood and frame for holding said brush shaft in adjusted position.

References Cited in the file of this patent

UNITED STATES PATENTS

| | | |
|---|---|---|
| 1,119,393 | Binkley | Dec. 1, 1914 |
| 1,615,928 | Breeden | Feb. 1, 1927 |
| 2,727,265 | Dunham | Dec. 20, 1955 |